United States Patent [19]

Lewis et al.

[11] 4,424,543
[45] Jan. 3, 1984

[54] METHOD AND APPARATUS FOR RECORDING TRANSDUCER POSITIONING INFORMATION

[75] Inventors: Martyn A. Lewis, Pacific Palisades; Steven K. Penniman, Goleta; David A. Sutton, Santa Ynez, all of Calif.

[73] Assignee: DMA Systems Corporation, Goleta, Calif.

[21] Appl. No.: 321,747

[22] Filed: Nov. 16, 1981

[51] Int. Cl.³ .................. G11B 5/82; G11B 21/10; G11B 21/08

[52] U.S. Cl. .................................. 360/135; 360/77; 360/78

[58] Field of Search ............ 360/135, 75, 77, 78, 360/27, 131, 72, 69, 70, 71, 73, 133, 97, 98, 99; 318/568, 571

[56] References Cited

U.S. PATENT DOCUMENTS

| | | | |
|---|---|---|---|
| 3,292,168 | 12/1966 | Gray | 340/174.1 |
| 3,792,454 | 2/1974 | Lipp | 340/174.1 G |
| 3,864,741 | 2/1975 | Schwarz | 360/77 |
| 4,027,338 | 5/1977 | Kril | 360/135 |
| 4,068,267 | 1/1978 | Inouye | 360/75 |
| 4,087,843 | 5/1978 | Louis et al. | 360/78 |
| 4,101,942 | 7/1978 | Jacques | 360/77 |
| 4,149,200 | 4/1979 | Card | 360/77 |
| 4,238,809 | 12/1980 | Fujiki et al. | 360/131 |
| 4,297,734 | 10/1981 | Laishley | 360/78 |
| 4,297,737 | 10/1981 | Andresen | 360/77 |

Primary Examiner—Robert Martin Kilgore
Attorney, Agent, or Firm—Spensley, Horn, Jubas & Lubitz

[57] ABSTRACT

In a magnetic disc storage system and a magnetic disc therefor, the disc having opposed surfaces, at least one of the surfaces being coated with a magnetic material, the disc being adapted to be mounted on a spindle for rotation relative to a magnetic transducer positioned for recording data on and retrieving data from the disc, a plurality of concentric annular tracks being defined on the surface of the disc, each of the tracks being divided into a plurality of sectors, each sector having associated therewith prerecorded servo data for identification thereof, the improvement wherein the servo data for each sector comprises a unit distance track identification code recorded three times in succession, the code changing between adjacent sectors of adjacent tracks, and a clock shift check code recorded immediately following the last recorded one of the track identification codes, the same clock shift check code being recorded for each sector of every track.

9 Claims, 2 Drawing Figures

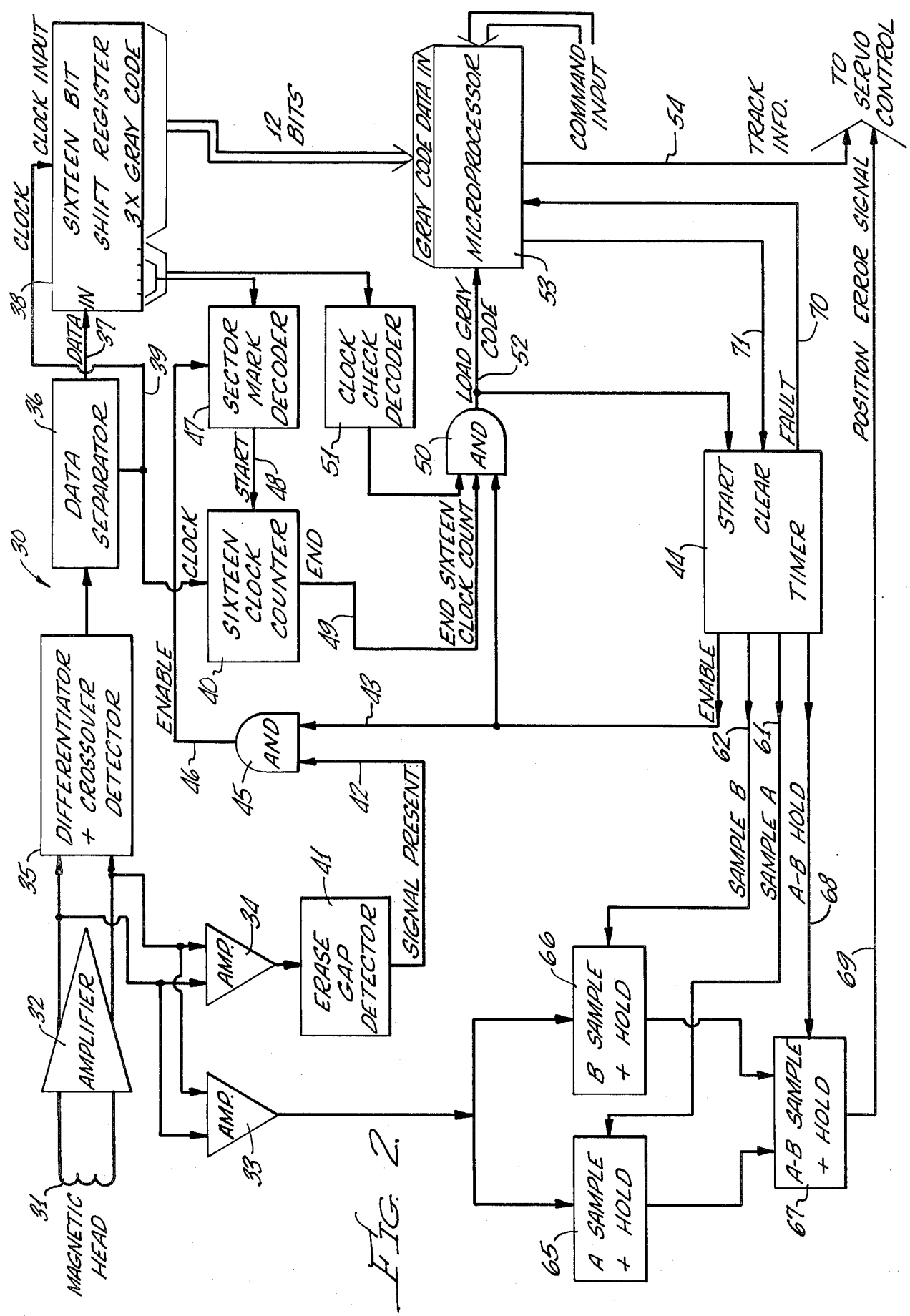

METHOD AND APPARATUS FOR RECORDING TRANSDUCER POSITIONING INFORMATION

BACKGROUND OF THE INVENTION

1. Field of the Invention

The present invention relates to a method and apparatus for recording and retrieving transducer positioning information in a magnetic disc storage system and, more particularly, to such a method and apparatus which incorporates features which improve system reliability in the presence of noise, media defects and spindle speed variations.

2. Description of the Prior Art

Magnetic disc storage systems are widely used to provide large volumes of relatively low-cost computer accessible memory or storage. A typical disc storage system includes a number of discs coated with a suitable magnetic material mounted for rotation on a common spindle and a set of transducer heads carried in pairs on elongated supports for insertion between adjacent discs, the heads of each pair facing in opposite directions to engage opposite faces of adjacent discs. The support structure is coupled to a positioner motor, the positioner motor typically including a coil mounted within a magnetic field for linear movement and oriented relative to the discs to move the heads radially over the disc surfaces to thereby enable the heads to be positioned over any annular track on the surfaces. In normal operation, the positioner motor, in response to control signals from the computer, positions the transducer heads radially for recording data signals on or retrieving data signals from a preselected one of a set of concentric recording tracks on the discs.

In such a system, it is necessary to record data on a disc to enable the transducer heads to locate the desired recording track. Accordingly, a number of track following systems for magnetic disc drives have been developed. Most commonly, a disc surface and a head have been dedicated to the recording of position information for use by the track following servo system. In these systems, position information is recorded continuously around the disk. Typical techniques for recording position information are disclosed in U.S. Pat. No. 3,534,344 to Santana and U.S. Pat. No. 3,691,543 to Mueller. In both of these patents, position information is derived from single pulse amplitudes which are time-gated from recorded clock pulses. In the continuous systems for which they were designed, these pulses are repeated continuously around the disc and position information is continuously derived at the output of a comparator.

In such a continuous system, each track crossing can be detected by the track following circuitry no matter how fast the head carriage might be moving. For this reason, track identification information can be derived by simply decrementing a track difference counter until the difference is equal to zero, meaning that the transducer head has arrived at the desired track.

For a variety of practical reasons, it is desirable to place track position information on the same surface as the data information and to eliminate the use of a dedicated surface and head for track position information. One reason is that misregistration of the disc center due to disc interchange or temperature variations can be accommodated since the head is moved directly to the track of interest. Another reason is that the physical alignment of the heads in a disc drive is not as critical as it is where there are multiple heads which must be aligned on multiple surfaces. As a result, no field adjustments are generally required. Another obvious reason is that an entire disc surface need not be dedicated to track position information.

As a result, most recently developed systems have employed embedded servo information (i.e., prerecorded identification information, on the same surface used for recording data, for use by the head tracking servo system). In the most practical form of embedded servo system, each track is divided into a plurality of sectors and the track identification and fine position information is recorded at the beginning of each data sector. This information is then read by the same head that reads and writes data on the disc. Previous embedded servo systems are exemplified by U.S. Pat. No. 4,208,679 to Hertrich, U.S. Pat. No. 4,163,265 to Van Herk et al, U.S. Pat. No. 4,149,201 to Card, U.S. Pat. No. 3,812,533 to Kimura, U.S. Pat. No. 3,185,972 to Sipple and British Patent Application No. 2,017,364 to Droux.

Several problems arise from the use of embedded servo information. The data/servo head is capable of writing over and therefore destroying the servo information and this must be prevented. During a high speed search for a given track and sector, the head may cross several tracks between sectors of embedded servo information. Since servo information is recorded only once per sector in a short burst, the effect of a defect in the disc or a noise burst is much more severe.

SUMMARY OF THE INVENTION

According to the present invention, there is provided a method and apparatus for recording and retrieving embedded servo information which incorporates a variety of features which improve system reliability in the presence of noise, media defects and spindle speed variations. The present method and apparatus is capable of an extremely high degree of accuracy, even in the presence of high head carriage speeds. The present system has a significantly reduced susceptibility to noise bursts and to defects in a disc surface. The present system virtually eliminates the possibility of the data/servo head writing over and therefore destroying the servo information.

Briefly, the present invention achieves the above by recording a unique pattern of servo data at the beginning of each data sector. Specifically, the embedded servo data includes a gap which is fully DC erased and which is used as an initial time sync for the servo information recovery system. A multiple-bit burst of "zeros" is recorded following the erase gap in order to provide a clock synchronization signal for a data separator. This burst of zeros is followed by a special sector mark code consisting of a multiple-bit burst of "ones" which is used as an additional verification of embedded servo timing information from which the next multiple bits are expected to be track identification data and a check code. A track identification code in Gray code format is repeated three times in succession. This code changes between adjacent sectors of adjacent tracks and provides tolerance for media defects. Following the three track identification codes, a special clock shift check code which is the same for all sectors and all tracks is recorded as a means of verifying that a noise pulse or media defect has not caused a time shift error in the previous bits of track identification data. Two bursts of high density transitions are recorded on the disc following the check code for the purpose of providing fine position information. These bursts are written so as to equally overlap adjacent tracks and to be offset in time so that they may be readily separated by the servo information recovery system. These bursts are recorded so that when a head is on track, the amplitude of the signal from one burst is equal to the amplitude of the signal from the other burst.

OBJECTS, FEATURES AND ADVANTAGES

It is therefore an object of the present invention to solve the problems associated with the unreliability of detected servo information as a result of noise, media defects and spindle speed variations. It is a feature of the present invention to solve these problems by recording servo data in a format such that a unit distance track identification code is recorded a plurality of times in succession followed by an unvarying clock shift checkcode. An advantage to be derived is a system capable of an extremely high degree of accuracy. Another advantage is a system having a significantly reduced susceptibility to media defects. A still further advantage is the virtual elimination of the possibility of a data/servo head writing over and therefore destroying servo information. Another advantage is a system which detects spindle speed variations. Still another advantage is a system which detects time shift errors. Still another advantage is the elimination of precise timing accuracy for the obtaining of position data. Still another advantage is an improvement in signal-to-noise ratio.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 2 is a block diagram of a preferred implementation of a servo information recovery system.

DESCRIPTION OF THE PREFERRED EMBODIMENT

Figure 1:
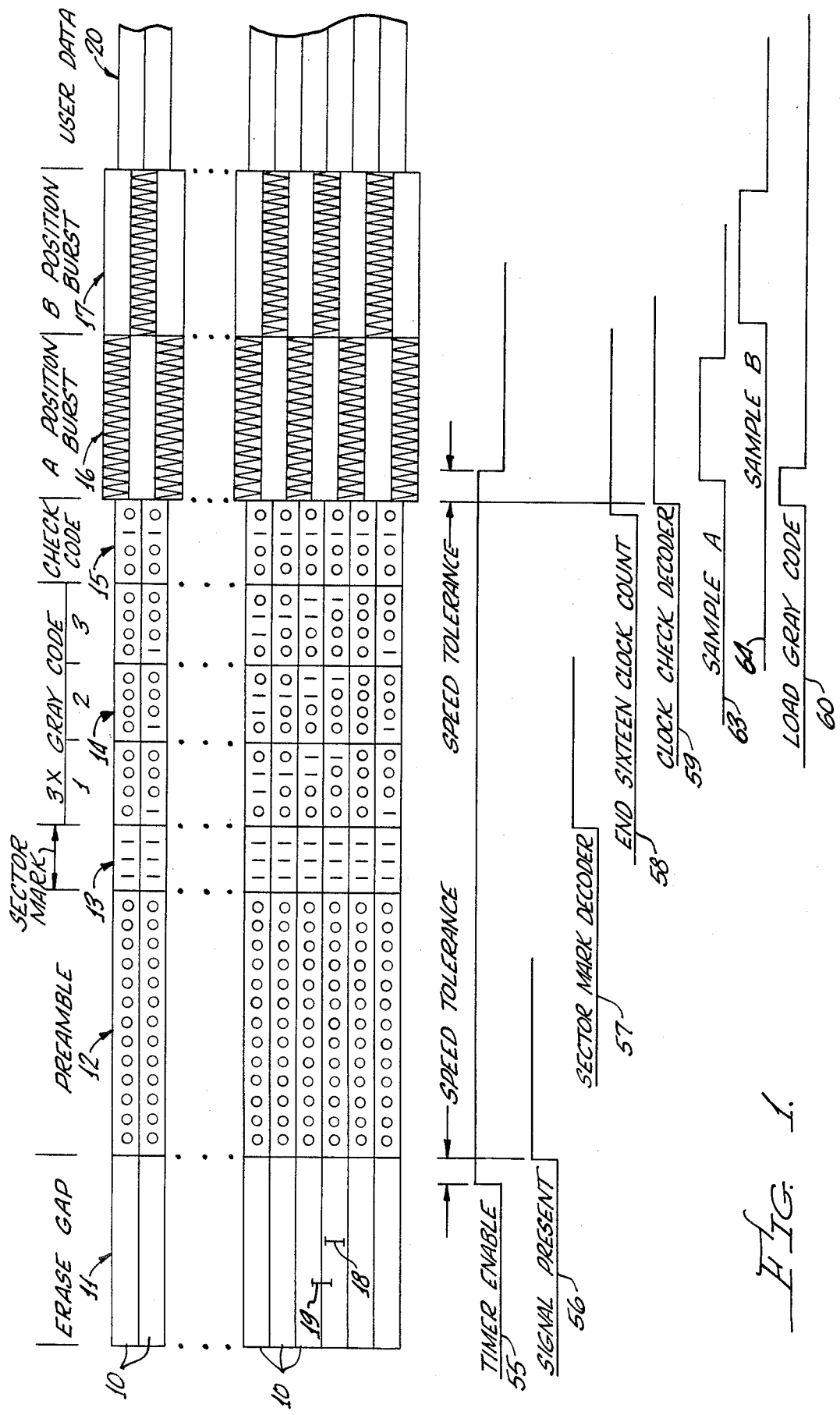
FIG. 1 shows diagrammatically the information recorded on a disc surface together with a timing diagram showing the normal timing of the various signals.

Referring now to FIG. 1, there is diagrammatically shown the information recorded on the surface of a disc (not shown) adapted for use in a magnetic disc recording system (not shown). FIG. 1 shows adjacent portions of adjacent tracks 10, specifically the portions of tracks 10 at the beginning of a sector where the head positioning data is recorded for use by a servo system for deriving position information. From an inspection of FIG. 1, it is seen that the embedded servo data for each data sector includes an erase gap 11, i.e. a band at the beginning of each servo sector which is fully DC erased. In the recording codes generally used in magnetic disc recording systems, "ones" and "zeros" are both identified by the existence of recorded transitions so that a fully erased area is distinctly identifiable. Erase gap 11 is used for initial time synchronization for the servo information recovery system, to be described more fully hereinafter. Following erase gap 11 are two bands 12 and 13 of prerecorded sector identification data. Band 12 is referred to herein as a preamble and preferably consists of a thirteen-bit burst of "zeros" recorded immediately following erase gap 11 in order to provide a clock synchronizing signal for a data separator, to be described more fully hereinafter. Immediately following the preamble in band 12 is a sector mark code in band 13, preferably a three-bit burst of "ones" used as an additional verification of embedded servo timing information to indicate that the next bits should be track identification data and a check code.

In magnetic disc drives using embedded servo techniques, the requirement exists for knowledge of which track the head is currently positioned over. To accommodate this requirement, track boundary crossings are typically counted. In continuously recorded servo implementations, counting boundaries during high speed head moves is no problem since information is available continuously. However, in an embedded servo system where track boundary information is available only on an intermittent basis, as here, it is possible to skip track boundaries. Hence, there arises a need for track identification. This identification could go to the extreme of recording an absolute track address for every track on the disc. A more practical implementation is to record repeated bands wherein the tracks are identified within the band, i.e. groups of sixteen tracks per band where the tracks within the band are numbered 0–15. This requires only four bits of data for track identification.

In recording this type of data, it is preferable to use a unit distance code, commonly referred to as a Gray code. These codes were developed so that only one bit of the code changes as a boundary between tracks is crossed. Use of a Gray code limits ambiguity to a head position uncertainty of $\pm\frac{1}{2}$ track.

According to the present invention, sector mark band 13 is followed by a band 14 containing a four-bit track identification code in Gray code format which is repeated three times in succession (a total of twelve bits). Recording the Gray code track identification information three times provides for more than mere redundancy. More specifically, one of the purposes and objects of the present invention is to record data in a way that the servo information recovery system is insensitive to media defects. Such media defects typically occur in the form of pinholes on the surface of the disc where magnetic signals are not recorded. If a track identification code is recorded only once and a pinhole obliterates one or more of the bits of data, it would be impossible to read a correct code. If a track identification code is recorded twice and a pinhole obliterates one or more of the bits of data in one of the codes, again it would be impossible to determine which code is the correct one. On the other hand, by recording the track identification code three times, a two-out-of-three vote can be implemented in a microprocessor such that if two out of the three track identification codes agree, it may be assumed that valid track identification information has been detected.

Even if the microprocessor determines that two out of the three or all three track identification codes agree, it still cannot be stated with assurance that valid track identification information has been detected. The reason for this is that the loss of one or more data bits could cause a time shift in the data so that all data bits are shifted by one or more bits. If this should occur, each of the three track identification codes could be the same, but each could be wrong. In order to eliminate time shift errors, band 14 is followed by a band 15 having recorded therein a special clock shift check code as a means of verifying that a noise pulse or media defect has not caused a time shift error in the previous twelve bits of track identification data.

As shown in FIG. 1, the check code selected consists of four bits, specifically "0010". This exact same check code appears at the end of the track identification data in every sector of every track 10. The servo information recovery system looks to see whether this bit pattern follows the track identification data and, if it exists, it is now assumed that the data just read is correct. From an inspection of the check code, it will be apparent that any time shift error will cause a change in the location of the "1" so as to invalidate the track identification data.

The fact that the exact same check code appears in every sector of every track 10 is significant. Conventional check codes would be ineffective in a magnetic disc recording system. Conventional check codes are generated by performing a mathematical algorithm on recorded data and forming data bits which relate to the recorded data. In data retrieval, the mathematical algorithm is performed on the recovered data and the derived check code is compared with the recorded check code. However, in a magnetic disc storage system where a head is positioned between adjacent tracks, recording data in a Gray code format will limit head position ambiguity, but there is no way to insure that the retrieved check code will relate to the retrieved track identification data if the check code is different for each track. This leads to the present use of the exact same check code in every sector of every track.

According to the preferred embodiment of the present invention, band 15 is followed by bands 16 and 17 in which there is recorded high density transitions, generally designated "A" and "B", respectively, for the purpose of providing fine position information. Bands 16 and 17 are offset in time and are offset laterally relative to each other and relative to tracks 10 so that each band equally overlaps adjacent tracks 10. It will be apparent that when a transducer head, to be described more fully hereinafter, is in position 18 (FIG. 1), where it is exactly aligned with a track 10, the amplitude of the signal received by such head from band 16 will be equal to the amplitude of the signal received from band 17. This information can be used by the servo information recovery system to indicate that the head is "on track". On the other hand, when the head is in position 19 between adjacent tracks 10, the head will receive a signal only from band 17. In intermediate positions, the inequality of the A and B signals from bands 16 and 17 may be used to indicate the location of the head relative to any one of tracks 10.

Following bands 16 and 17 appear bands 20 having no data recorded therein for receipt of data from the user of the system. Each band 20 will be followed by a band 11 and the pattern will repeat.

Referring now to FIG. 2, there is shown a preferred implementation of a servo information recovery system, generally designated 30. System 30 adapted for use in a magnetic disc storage system of the type described hereinbefore. Such a system incorporates one or more transducer heads 31 carried at the end of an elongated support to thereby enable such head to be positioned over any annular track on the surface of a disc. For a fuller discussion of a magnetic disc storage system, reference should be had to copending U.S. patent application Ser. No. 321,884 filed Nov. 16, 1981, now U.S. Pat. No. 4,376,294, entitled "Head Loading and Retraction Apparatus for Magnetic Disc Storage Systems" and assigned to DMA Systems Corporation, the assignee of the present application.

Head 31 is flying over the surface of the rotating magnetic disc producing read-back signals in response to the prerecorded servo data shown in FIG. 1. The signal from head 31 is amplified by an amplifier 32, the output of which is conducted to additional amplifiers 33 and 34 and a differentiator and crossover detector 35. Amplifiers 32-34 simply increase the amplitude of the signal from head 31 in order to provide an adequate signal level for the various recovery electronic functions. The analog signal from amplifier 32 is differentiated and crossover detected by circuit 35 to provide a digital version of the recorded analog information. Accordingly, the output of circuit 35 is a logic level signal with pulses occurring at each plus or minus peak of the original waveform from magnetic head 31. Such a differentiator and crossover detector is well known to those skilled in the art.

The output of circuit 35 is then applied to a data separator 36 which is capable of decoding the train of pulses from circuit 35 into "ones" and "zeros" according to the recording code used when the servo data format was recorded. The exact construction and function of data separator 36 will, therefore, depend upon the particular recording data format used. Data separator 36 requires a preamble of all "zeros" in order to distinguish the clock transitions of the recorded data code and to synchronize its circuit function for reliable data decoding. Thus, data separator 36 utilizes the burst of zeros recorded in preamble 12. In any event, circuits capable of decoding a train of pulses into "ones" and "zeros" in accordance with a particular recording code are well known to those skilled in the art.

The output of data separator 36 on a line 37 consists of a serial string of data which is fed to the input of a sixteen-bit shift register 38. In addition, data separator 36 generates a clock signal that is applied to the clock input of shift register 38, to be used as a shift clock, and to a sixteen-clock counter 40. Shift register 38 is a conventional shift register and counter 40 is a conventional digital counter.

An erase gap detector 41 responsive to the output of amplifier 34 is the circuit that starts the entire process of servo data recovery. That is, at the end of erase gap 11, which is detected by an interval wherein no signal is received from head 31, the onset of preamble data in band 12 causes erase gap detector 41 to generate a logic level "one" on a line 42 indicating that there is "signal present". This signal on line 42 is applied together with a "timer enable" signal on a line 43 from a timer 44 to the input of an AND gate 45. When both inputs to AND gate 45 are true, an "erase gap enable" signal is generated on a line 46 which is used to activate a sector mark decoder 47. Sector mark decoder 47 is connected to the output of shift register 38 so as to monitor the first three bits of data. Accordingly, sector mark decoder 47 outputs a "start" pulse on a line 48 on the occurrence of the sector mark code "111" provided "erase gap enable" line 46 is true. The start pulse on line 48 is applied to counter 40. Erase gap detector 41 may be implemented by combining a conventional peak detector with a threshold circuit in order to detect the presence of a signal from head 31.

Sector mark decoder 47 may be a simple three-input AND gate to detect the presence of three "ones" in shift register 38.

System 30 has now been conditioned to receive and analyze the next sixteen bits of data from magnetic head 31. It should be noted that in order for this to occur, erase gap detector 41 must sense the erase gap, timer 44 must enable gate 45, and sector mark decoder 47 must detect the sector mark code recorded in band 13.

The start pulse on line 48 initiates a counting of the next sixteen clock pulses from data separator 36 by counter 40, at the end of which an "end 16 clock count" line 49 goes true. The signal on line 49 is applied as one input to a three input AND gate 50. AND gate 50 also receives an input on line 43 from timer 44 and a signal from a clock detector 51. Clock check decoder 51 may be a circuit similar to sector mark decoder 47 and is coupled to the output of shift register 38 so as to monitor the most recently recorded four bits of data. Since the track identification data on band 14 is received first, the most recently recorded four bits should be the data in check code band 15. When these four bits are "0010", the output of decoder 51 will be true. Thus, if the three inputs to AND gate 50 are simultaneously true, gate 50 will generate a true "load Gray code" signal on a line 52 connected to a microprocessor 53. Microprocessor 53 is also coupled to the output of shift register 38.

It should be noted here that at the end of sixteen clock pulses, the three successively recorded track identification bits in Gray code format and the clock check code should be present in register 38. As mentioned previously, the clock check code is used to insure that no noise or media defects have caused a clock pulse failure which may mean that every bit of the sixteen bits could be mispositioned in register 38 by one or more bits. In such a case, even a majority vote of three Gray codes could be in error. The bit pattern selected for the clock check code in band 15 is absolutely reliable for protection against a ±2 bit shift error so that the presence of a "load Gray code" signal on line 52 is a highly reliable indication of the validity of the Gray code data. Accordingly, a command on line 52 is used to instruct microprocessor 53 to read the twelve bits of track identification data and to determine a majority decision on the track just read by magnetic head 31. If two out of the three Gray code signals are consistent, microprocessor 53 outputs track information on a line 54 which is used by the servo control circuitry (not shown).

The "load Gray code" signal on line 52 is also used to start timer 44, which has several functions. Timer 44 is a very accurate device, preferably including a precise crystal oscillator, so that time decodes can be accurate to within 0.01%. The first function of timer 44 is to bring true the "timer enable" signal on line 43 at a time just before the next expected "signal present" occurrence on line 42 and to set it false again just after the next expected clock check decode signal from decoder 51. This time accurate "timer enable" gate provides protection against the possibility that the speed of the spindle driving the disc is out of speed tolerance, an occurrence which could endanger the embedded servo data. Writing of data on the disc is allowed by the write control circuitry (not shown) only after a proper occurrence of a "load Gray code" signal on line 52 in the embedded servo field preceding the data field to be written. This assures that the track following servo information is acceptable and that the spindle speed control system is functioning properly so as to prevent the head 31 from writing over and therefore destroying the embedded servo information.

FIG. 1 also shows the normal timing of the various signals. That is, the "timer enable" pulse on line 43 from timer 44 is shown at 55. It is seen that this signal goes true just prior to band 12 and goes false again just after band 15. The distance between the time when the "timer enable" pulse goes true and the "signal present" signal on line 42 goes true, as shown at 56, is the degree of speed tolerance permitted by system 30. The output of sector mark decoder 47 on line 48 is shown in FIG. 1 at 57, the "end 16 clock count" signal on line 49 from counter 40 is shown at 58, the output of clock check decoder 51 is shown at 59, and the "load Gray code" signal on line 52 from gate 50 is shown at 60.

Timer 44 also provides time gate pulses for sampling the high density data bursts from bands 16 and 17. Thus, timer 44 provides accurately timed gate signals on lines 61 and 62 (shown at 63 and 64, respectively, in FIG. 1) which are applied to A and B sample and hold circuits 65 and 66, respectively. Circuits 65 and 66 receive the output of amplifier 33. The outputs of circuits 65 and 66 are applied to a third A-B sample and hold circuit 67 which receives a timing signal from timer 44 over a line 68.

Circuits 65 and 66 are conventional analog sample and hold circuits which, when activated, sample the analog level of an input signal and hold it for further use. As can be seen from an inspection of the timing diagrams of FIG. 1, timer 44 activates circuit 65 at a time when the A position data is expected from band 16 and activates circuit 66 at a time when the B position data is expected from band 17. The A and B data from bands 16 and 17 as sampled by circuits 65 and 66 is applied to circuit 67 which forms the difference (A-B) therebetween. This difference signal is a "position error signal" which is applied via a line 69 to the servo control circuitry to correct the location of magnetic head 31 and to hold it "on track".

In the event of noise at the output of magnetic head 31 during the servo data time, the absence of a "load Gray code" signal on line 52 will inhibit the issuance of new "track information" on line 54 and an updated "position error signal" on line 69 so that bad data is not sent to the servo control circuitry, thus preserving the last good (noise-free) sample of information. If two consecutive "load Gray code" signals on line 52 are missed by timer 44, a "fault" signal is sent over a line 70 to microprocessor 53 and appropriate system action is taken. A "clear" signal is issued by microprocessor 53 and applied to timer 44 over a line 71 to enable timer 44 to accomplish a restart of servo information recovery system 30.

In summary, in embedded servo applications where position information is available only intermittently at the beginning of each data sector, it is extremely important to acquire position information in a timely manner. It is also imperative that this position information be free from noise effects from all sources. It is particularly important that minor defects in the recording media itself not affect the integrity of the position information.

It can therefore be seen that according to the present invention there is provided a method and apparatus for recording embedded servo information which incorporates a variety of features which improve system reliability in the presence of noise, media defects, and spindle speed variations. The present method and apparatus is capable of an extremely high degree of accuracy, even in the presence of high head carriage speeds. The present system has a significantly reduced susceptibility to noise bursts and to defects in the disc surface. Furthermore, the present system virtually eliminates the possibility of the data/servo head writing over and therefore destroying the servo information.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. In a disc having opposed surfaces, at least one of said surfaces being coated with a magnetic material, said disc being adapted to be mounted on a spindle for rotation relative to a magnetic transducer positioned for recording data on and reading data from said surface, a plurality of concentric annular tracks being defined on said surface of said disc, each of said tracks being divided into a plurality of sectors, each such sector having associated therewith prerecorded data for identification thereof, the improvement wherein said prerecorded identification data comprises:
   a track identification code recorded a plurality of times in succession, said code changing between adjacent sectors in adjacent tracks; and
   a clock shift check code recorded immediately following the last recorded one of said track identification codes, the same clock shift check code being recorded for each sector of every track.

2. In a disc according to claim 1, the improvement wherein said track identification code is a unit distance code.

3. In a disc according to claim 1, the improvement wherein said track identification code is recorded in a Gray code format.

4. In a disc according to claim 1, 2 or 3, the improvement wherein said track identification code is recorded three times.

5. In a disc according to claim 1 or 2, the improvement wherein said clock shift check code consists of a plurality of bits of data wherein said bits of data are the same for each sector of every track.

6. In a disc according to claim 1 or 2, the improvement wherein said prerecorded identification data for each sector further comprises:
   a pair of bursts of high density transitions recorded following each check code and further recorded so as to equally overlap adjacent tracks and being offset in time for the purpose of providing fine position information.

7. In a disc according to claim 6, the improvement wherein said bursts of high density transitions are recorded so that when said magnetic transducer is aligned with a track, the amplitude of the signal received by said transducer from the bursts of each pair are equal.

8. In a disc according to claim 6, the improvement wherein said prerecorded identification data for each sector further comprises:
   a fully DC erased gap for providing initial time synchronization; and
   a predetermined pattern of data bits recorded following each DC erased gap for providing clock synchronization, said predetermined pattern being recorded for each sector and for each track, said track identification code following said predetermined pattern of data bits.

9. In a disc according to claim 1 or 2, the improvement wherein said prerecorded identification data for each sector further comprises:
   a fully DC erased gap for providing initial time synchronization; and
   a predetermined pattern of data bits recorded following each DC erased gap for providing clock synchronization, said predetermined pattern being recorded for each sector and for each track, said track identification code following said predetermined pattern of data bits.

* * * * *